United States Patent
Mai

(10) Patent No.: US 8,051,329 B1
(45) Date of Patent: Nov. 1, 2011

(54) METHOD AND SYSTEM FOR INITIALIZING A COMPUTING SYSTEM

(75) Inventor: Huynh Duc Mai, Milpitas, CA (US)

(73) Assignee: NETAPP, Inc., Sunnyvale, CA (US)

( * ) Notice: Subject to any disclaimer, the term of this patent is extended or adjusted under 35 U.S.C. 154(b) by 0 days.

(21) Appl. No.: 12/701,355

(22) Filed: Feb. 5, 2010

(51) Int. Cl.
G06F 11/00 (2006.01)

(52) U.S. Cl. .................. 714/21; 713/1; 713/2; 714/6.1; 714/6.11; 714/36

(58) Field of Classification Search .................. 713/1, 2; 714/6.1, 6.11, 21, 36
See application file for complete search history.

(56) References Cited

U.S. PATENT DOCUMENTS

| | | | |
|---|---|---|---|
| 5,164,577 A * | 11/1992 | Horie | 235/494 |
| 5,699,549 A * | 12/1997 | Cho | 711/115 |
| 6,279,089 B1 * | 8/2001 | Schibilla et al. | 711/162 |
| 7,302,560 B2 * | 11/2007 | Jordan et al. | 713/1 |
| 7,730,326 B2 * | 6/2010 | Girish et al. | 713/191 |
| 2008/0126776 A1 * | 5/2008 | Takayama | 713/1 |
| 2008/0294838 A1 * | 11/2008 | Houston et al. | 711/103 |
| 2010/0241798 A1 * | 9/2010 | Wong | 711/103 |
| 2011/0060897 A1 * | 3/2011 | Toelkes | 713/2 |

* cited by examiner

Primary Examiner — Robert Beausoliel, Jr.
Assistant Examiner — Joshua P Lottich
(74) Attorney, Agent, or Firm — Klein, O'Neill & Singh, LLP

(57) ABSTRACT

Method and system for executing instructions out of a non-volatile memory that may have defective blocks is provided. During an initialization process, a processor reads operating system instructions from the non-volatile memory that may have defective blocks. While reading the operating system instructions, the processor expects a valid signature at a known offset. If the processor does not receive a valid signature at the expected offset, the processor continues to search for a valid signature for X more blocks after the offset. The X blocks are the number of defective blocks in a memory partition where the operating system instructions are stored.

19 Claims, 3 Drawing Sheets

US 8,051,329 B1

METHOD AND SYSTEM FOR INITIALIZING A COMPUTING SYSTEM

TECHNICAL FIELD

The present disclosure relates to computing systems.

BACKGROUND

To initialize and start a computing system, a processor typically reads initialization instructions (may also be referred to as "boot code") out of a dedicated memory chip during an initialization process (may also be referred to as "booting" or "boot" process). The initialization functions may be called to identify, test, and initialize system devices such as a video display card, storage device and other hardware. After executing the initialization instructions a computing system is set to a known state, so that any software stored on the storage device can be loaded and executed.

After the initialization instructions are read, the processor reads and attempts to execute operating system instructions. Non-volatile memory, for example, a NAND based flash memory is now commonly used to store operating system instructions and applications. The NAND based memory although cost effective and stable, may have challenges. For example, NAND based flash memory may include defective blocks. This presents a challenge during the initialization process because the computing system may expect operating system instruction code and/or application instruction code to be present at certain expected locations of the NAND memory. However, the instructions may not be present at the expected locations because of defective blocks, which may jeopardize the initialization process. Continuous efforts are being made to efficiently store executable instructions to initialize a computing system.

SUMMARY

In one embodiment, a method and system for executing instructions out of a non-volatile memory that may have defective blocks, for example, a NAND based flash memory, is provided. During an initialization process, a processor reads operating system instructions from a NAND based flash memory that may have defective blocks. While reading the operating system instructions, the processor expects a valid signature at a known offset. If the processor does not find a valid signature at the expected offset, the processor continues to search for a valid signature for X more blocks after the offset. The X blocks are the number of defective blocks in a NAND memory partition where the operating system instructions are stored.

In another embodiment, a machine implemented method for executing instructions during an initialization process out of a non-volatile memory having at least a defective block within a memory partition is provided. A processor determines if a valid signature is available at an expected offset of the memory partition. If the valid signature is unavailable at the expected offset, then the processor continues to read X more blocks from the expected offset, the X more blocks being a defective number of blocks within the memory partition. The processor then initializes a computing system by executing the instructions, if a valid signature is available within one of the X blocks. The processor aborts the initialization process if the valid signature is unavailable within one of the X blocks.

In yet another embodiment, a machine implemented method for executing instructions during an initialization process out of a non-volatile memory having at least a defective block is provided. The initialization process is initiated by reading initialization instructions from a non-volatile memory storing the initialization instructions.

After reading the initialization instructions, the processor begins reading the instructions out of the non-volatile memory having at least a defective block. The processor determines if a valid signature is available at the end of the instructions stored at the non-volatile memory having at least a defective block. If the valid signature is unavailable, then the processor continues to read X more blocks from an expected offset, the X more blocks being a defective number of blocks within the non-volatile memory having at least a defective block. The computing system is initialized if a valid signature is available within one of the X blocks.

In another embodiment, an apparatus is provided. The apparatus includes a first non-volatile memory for storing initialization instructions for initializing the apparatus during an initialization process. The apparatus also includes a second non-volatile memory having for storing instructions that are read during the initialization process, the second non-volatile memory having at least a defective block.

The apparatus further includes a processor configured to read the instructions from the second non-volatile memory and to determine if a valid signature is available at an expected offset of the second non-volatile memory. If the valid signature is unavailable at the expected offset, then the processor reads X more blocks from the expected offset, the X more blocks being a defective number of blocks in the second non-volatile memory. The processor initializes the apparatus by executing the instructions, if a valid signature is available from one of the X blocks and aborts the initialization process if the valid signature is unavailable within one of the X blocks.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

As used in this disclosure, the terms "component" "module", "system," and the like are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick, flash memory device or any other non-volatile memory device, or any other storage device, in accordance with the claimed subject matter.

In one embodiment, a method and system for executing instructions out of a non-volatile memory that may have defective blocks, for example, a NAND based flash memory, is provided. During an initialization process, a processor reads operating system instructions from a NAND based flash memory that may have defective blocks. While reading the operating system instructions, the processor expects a valid signature at a known offset. If the processor does not find a valid signature at the expected offset, the processor continues to search for a valid signature for X more blocks after the offset. The X blocks are the number of defective blocks in a NAND memory partition where the operating system instructions are stored.

Figure 1:
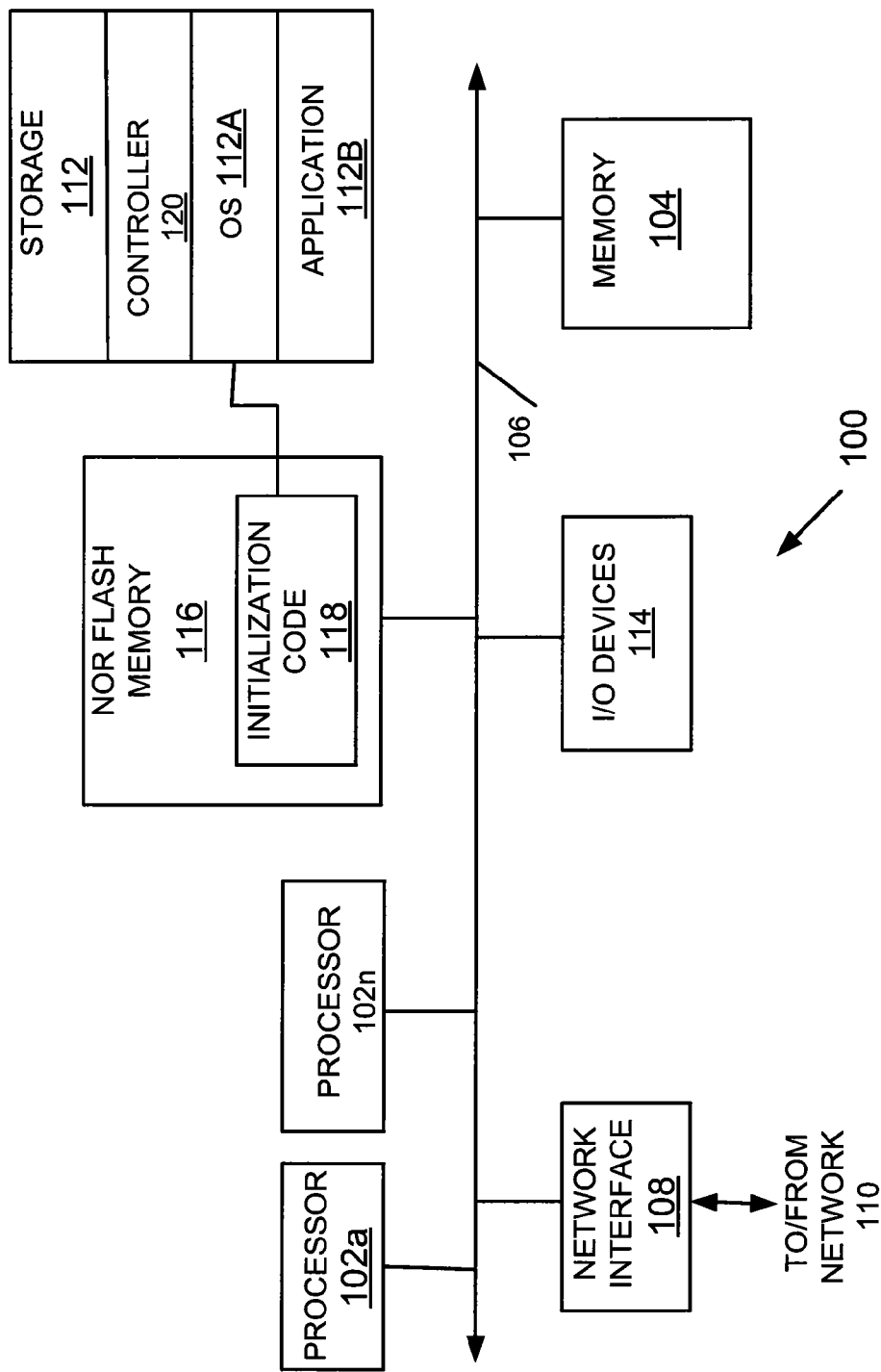
FIG. 1 shows a block diagram of a computing system, according to one embodiment.

FIG. 1 is a high-level block diagram of a computing system 100, according to one embodiment. System 100 includes one or more processors 102 (shown as 102a-102n) and memory 104, coupled to a bus system 106. The bus system 106 is an abstraction that represents any one or more separate physical buses and/or point-to-point connections, connected by appropriate bridges, adapters and/or controllers. The bus system 106, therefore, may include, for example, a system bus, a Peripheral Component Interconnect (PCI) bus, a HyperTransport or industry standard architecture (ISA) bus, a small computer system interface (SCSI) bus, a universal serial bus (USB), an Institute of Electrical and Electronics Engineers (IEEE) standard 1394 bus (sometimes referred to as "Firewire") or any other bus.

The processors 102 (or processor 102) are the central processing devices (CPUs) of computing system 100 and, thus, control its overall operation. In certain embodiments, the processors 102 accomplish this by executing programmable instructions stored in memory 104. Processor 102 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 104 represents any form of random access memory (RAM), read-only memory (ROM), flash memory, or the like, or a combination of such devices. Memory 104 includes the main memory of the processing system 100.

Also connected to processors 102 through bus system 106 are a network interface 108 and input/output (I/O) devices 114. The network interface 108 provides computing system 100 with the ability to communicate with remote devices over a network 110. Network interface 108 may be, for example, an Ethernet adapter, a Fibre Channel adapter, or the like. The I/O devices 114 may include, for example, a display device, a keyboard, a mouse, etc.

Computing system 100 may also includes storage 112. In one embodiment, storage 112 may be a non-volatile memory, for example, a NAND based flash memory with a controller 120. Controller 120 interfaces with processor 102 and controls overall storage 112 operations. Controller 120 may also keep track of the defective blocks in storage 112. The number of defective blocks is typically known during NAND flash memory manufacturing.

The NAND based flash memory may store operating system instructions 112A (shown as OS 112A) and code for one or more applications, shown as application 112B. The operating system instructions 112A are used to control overall computing system 100 operations and the applications 112B are provided to perform specific functions.

Computing system 100 may also include a NOR based flash memory 116 that stores initialization code 118. An initialization process (or "boot process") is executed by processor 102 before computing system 100 can be used to perform computing functions. During the initialization process, processor 102 reads the initialization code 118 out of memory 116 and the operating system instructions 112A out of storage 112. As explained above, NAND based storage 112 may have defective blocks that may pose a challenge for successfully completing the initialization process. This is explained below with respect to FIG. 2.

Figure 2:
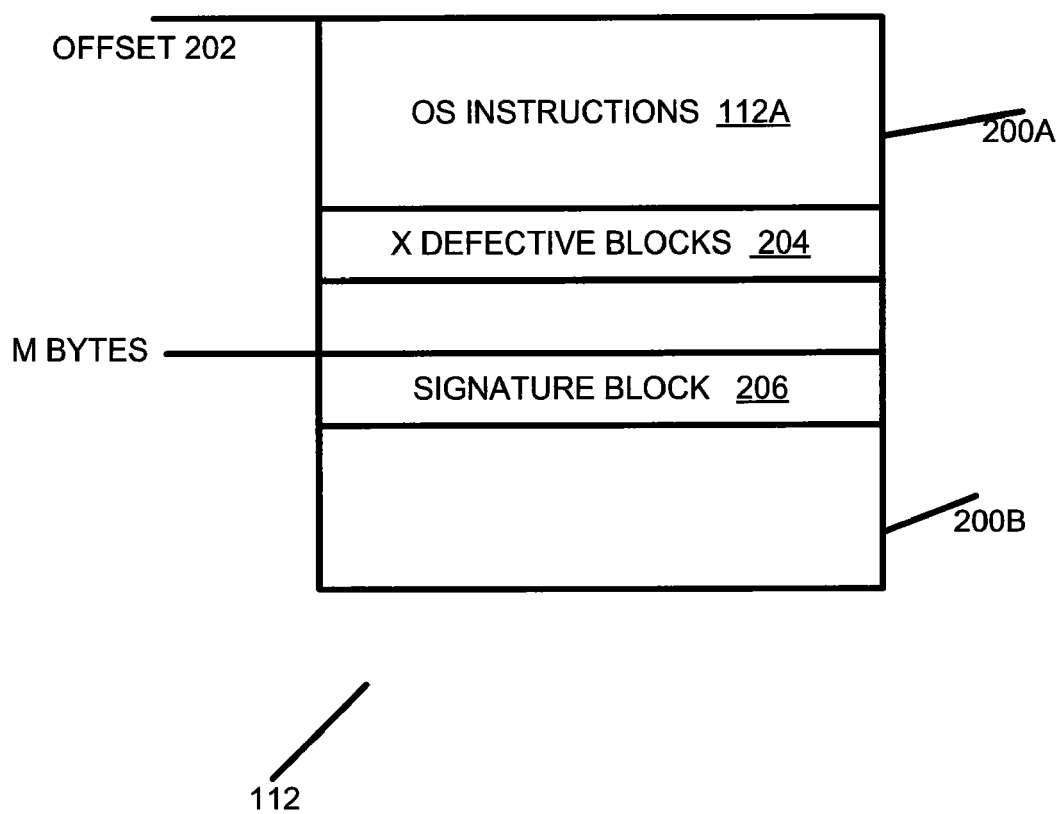
FIG. 2 is a layout of a non-volatile memory for storing processor executable instructions, according to one embodiment.

FIG. 2 shows an example of a layout for storing operating system instructions 112A at a NAND based storage, according to one embodiment. As an example, storage 112 is shown to have two partitions, 200A and 200B. Partition 200A stores operating system instructions 112A starting from offset 0 (202). Based on the size of the OS instructions 112A, processor 102 expects a valid stored signature after a certain number of blocks, for example, M bytes. The valid signature 206 may be electronic code that is used by processor 102 to verify the accuracy of the OS instructions 112A before computing system 100 is initialized.

However, between offset 0 and M bytes, there may be X defective blocks 204. A defective block is a block from where a processor cannot read information successfully or is not able to write information. Controller 120 maintains information regarding the X defective blocks. Typically, this information is gathered during NAND flash memory manufacturing.

During a conventional initialization process, if processor 102 does not find a valid signature, the initialization process is aborted. Hence the defective blocks present a challenge to successful completion of the initialization process.

One option for handling the defective blocks is to provide an operating system and an application code image to a manufacturer of computing system 100. The manufacturer may then load the image and use a custom computer program to provide detail partition information regarding where the code may be stored. This however is a labor intensive solution that would require one to customize each system because defective blocks for different storage may be at different locations. The embodiments disclosed herein provide a novel solution that reduces the need for customizing each system.

In one embodiment, the initialization code 118 includes an instruction based on which, if there are X defective blocks between offset 0 and M bytes, then after processor 102 has read M bytes, the processor 102 searches at least another X blocks to see if there is a valid signature 206. If a valid signature 206 is found after searching X blocks, then the initialization process is completed, otherwise, the process is aborted.

Figure 3:
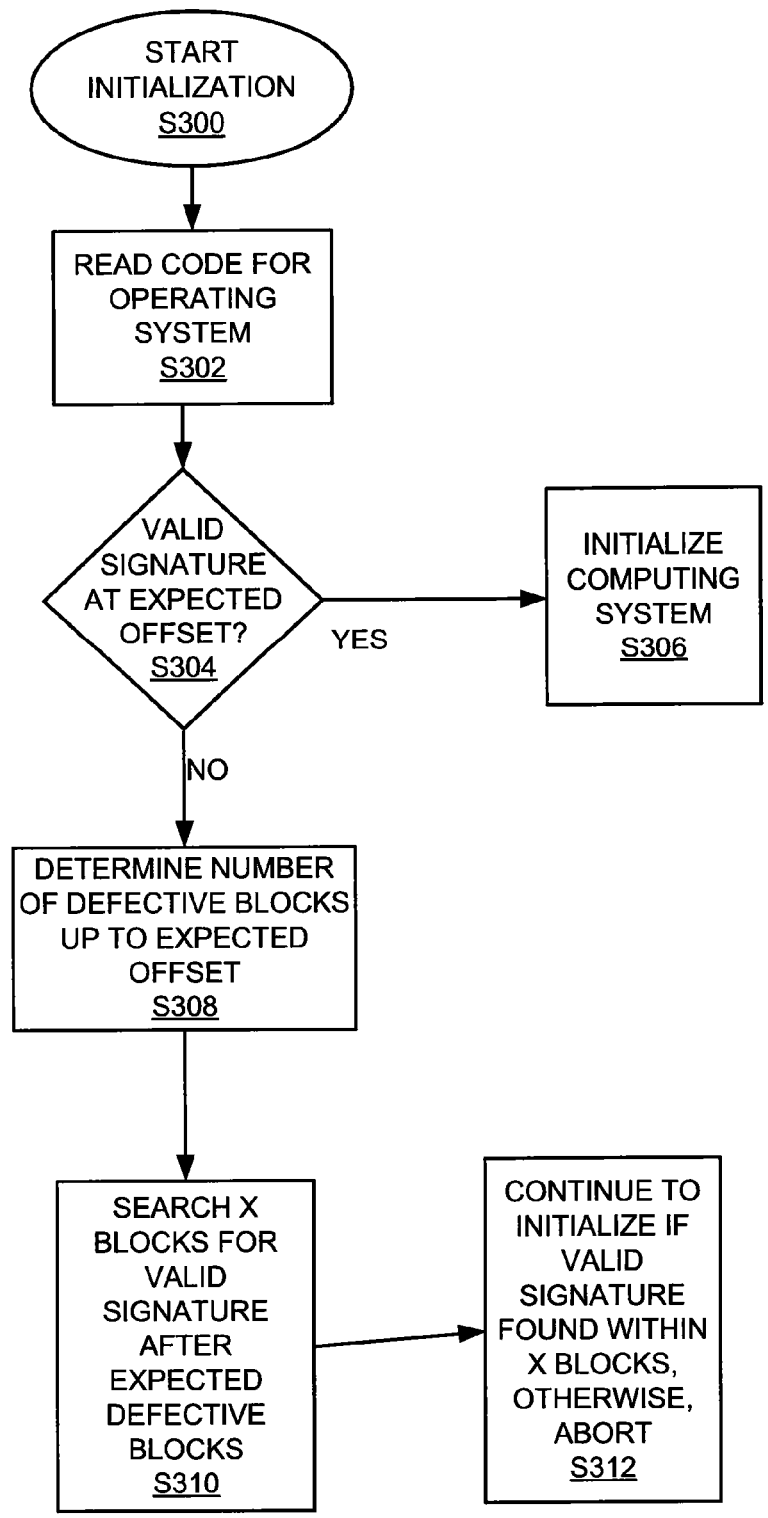
FIG. 3 is process flow for initializing a computing system, according to one embodiment.

FIG. 3 shows a process flow diagram of an initialization process, according to one embodiment. The process starts in block S300 when initialization code 118 is read out of memory 116.

In block S302, processor 102 reads OS instructions 112A out of NAND based flash memory 112 (or memory partition 200A, FIG. 2). In block S304, processor 102 determines if a valid signature is available at an expected offset, for example, after M bytes (See FIG. 2). The valid signature may be electronic code that is used by processor 102 to verify the accuracy of the OS instructions 112A before a computing system is initialized. The expected offset in this instance would depend on a starting offset (for example, 202, FIG. 2) and the size of the OS instructions 112A. Processor 102 knows the size of OS 112A and the starting offset and based on that processor 102 determines the expected offset.

If a valid signature is available, then the initialization process continues in block S306. A valid signature would be available at the expected offset if there are no defective blocks. If there are defective blocks, then a valid signature would not be available in block 5304. As discussed above, a defective block is a block from where a processor cannot read information or write information to.

In block S308, processor 102 obtains the number of defective blocks (for example, X blocks) between offset 0 and the offset where the valid signature is expected, for example, M bytes (FIG. 2). The information regarding defective blocks is maintained by controller 120 during memory manufacturing and configuration. Controller 120 provides the defective blocks information to processor 102.

In block S310, processor 102 continues to search for a valid signature for certain number of blocks. In one embodiment, processor 102 searches for X blocks, where X is at least equal to the number of defective blocks, between offset 0 and the offset where the valid signature is expected.

In block S312, the initialization process continues, if a valid signature is found in block S310, otherwise, the initialization process is aborted and an error message is generated.

In one embodiment, the process and system disclosed herein does not require one to write a custom program for storing operating system instructions in a non-volatile memory with defective blocks, for example, NAND based memory. By altering the initialization instructions and instructing the processor to search for additional blocks, one can efficiently store operating system and application instructions in a NAND based memory and also overcome the short comings of such a memory.

The foregoing examples have been provided with respect to a NAND based flash memory. The embodiments herein are not limited to a NAND based flash memory and are applicable to any type of memory that includes defective blocks.

Thus, a method and apparatus for storing and executing initialization instructions have been described. Note that references throughout this specification to "one embodiment" or "an embodiment" mean that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method for executing instructions during an initialization process out of a non-volatile memory having at least a defective block within a memory partition, comprising:
   determining if a valid signature is available at an expected offset of the memory partition; wherein a processor determines if the valid signature is available;
   continuing to read X more blocks from the expected offset if the valid signature is unavailable before the expected offset, the X blocks being a defective number of blocks within the memory partition and the processor continues to read the X blocks;
   initializing a computing system by executing the instructions, if the valid signature is available within one of the X blocks; and
   aborting the initialization process if the valid signature is unavailable within one of the X blocks.

2. The machine implemented method of claim 1, wherein the non-volatile memory is a NAND based flash memory.

3. The machine implemented method of claim 1, wherein a memory controller provides information regarding defective blocks to the processor.

4. The machine implemented method of claim 1, wherein the instructions include operating system instructions for the computing system.

5. The machine implemented method of claim 1, wherein the processor starts the initialization process by executing initialization instructions out of a NOR based non-volatile memory.

6. The machine implemented method of claim 1, wherein the expected offset is determined by a size of the instructions that are executed by the processor.

7. A machine implemented method for executing instructions during an initialization process out of a non-volatile memory having at least a defective block, comprising:
   initiating the initialization process by reading initialization instructions from a non-volatile memory storing the initialization instructions and the instructions out of the non-volatile memory having at least a defective block;
   determining if a valid signature is available at the end of the instructions stored at the non-volatile memory having at least a defective block; wherein a processor determines if the valid signature is available;
   continuing to read X more blocks from an expected offset, if the valid signature is unavailable, the X blocks being a defective number of blocks within the non-volatile memory having at least a defective block and the processor continues to read the X blocks; and
   initializing a computing system, if a valid signature is available within one of the X blocks.

8. The machine implemented method of claim 7, wherein the non-volatile memory having at least a defective block is a NAND based flash memory.

9. The machine implemented method of claim 7, wherein a memory controller provides information regarding defective blocks to the processor.

10. The machine implemented method of claim 7, wherein the processor aborts the initialization process if the valid signature is unavailable within one of the X blocks.

11. The machine implemented method of claim 7, wherein the instructions stored at the non-volatile memory having at least a defective block include operating system instructions for the computing system.

12. The machine implemented method of claim 7, wherein the initialization instructions are executed out of a NOR based non-volatile memory.

13. The machine implemented method of claim 7, wherein the expected off-set is determined by a size of the instructions that are executed by the processor from the non-volatile memory having at least a defective block.

14. An apparatus, comprising:
a first non-volatile memory for storing initialization instructions for initializing the apparatus during an initialization process,
a second non-volatile memory for storing instructions that are read during the initialization process, the second non-volatile memory having at least a defective block; and
a hardware processor configured to read the instructions from the second non-volatile memory and to determine if a valid signature is available at an expected offset of the second non-volatile memory;
wherein if the valid signature is unavailable at the expected offset, then the processor reads X more blocks from the expected offset, the X more blocks being a defective number of blocks in the second non-volatile memory, and initializes the apparatus by executing the instructions, if a valid signature is available from one of the X blocks; and aborts the initialization process if the valid signature is unavailable within one of the X blocks.

15. The apparatus of claim 14, wherein the second non-volatile memory is a NAND based flash memory.

16. The apparatus of claim 14, wherein a memory controller for the second non-volatile memory provides information regarding the defective blocks to the processor.

17. The apparatus of claim 14, wherein the instructions stored at the second non-volatile memory include operating system instructions for the apparatus.

18. The apparatus of claim 14, wherein the first non-volatile memory is a NOR based non-volatile memory.

19. The apparatus of claim 14, wherein the expected offset is determined by a size of the instructions that are executed by the processor from the second non-volatile memory.

* * * * *